No. 803,956. PATENTED NOV. 7, 1905.
J. C. ZUBLI.
SURGICAL APPARATUS FOR INTERNAL EXAMINATION.
APPLICATION FILED MAY 16, 1905.

No. 803,956. PATENTED NOV. 7, 1905.
J. C. ZUBLI.
SURGICAL APPARATUS FOR INTERNAL EXAMINATION.
APPLICATION FILED MAY 16, 1905.
2 SHEETS—SHEET 2.
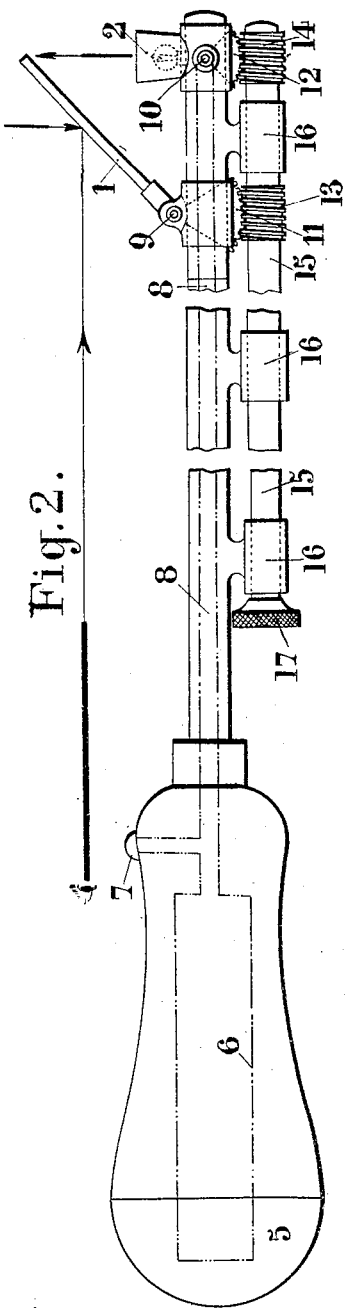
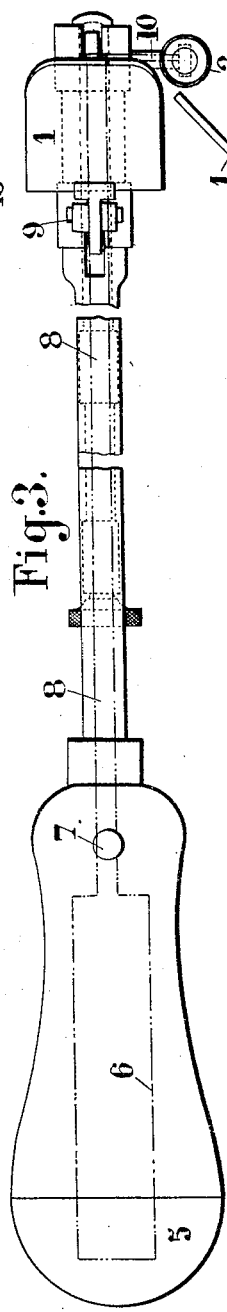
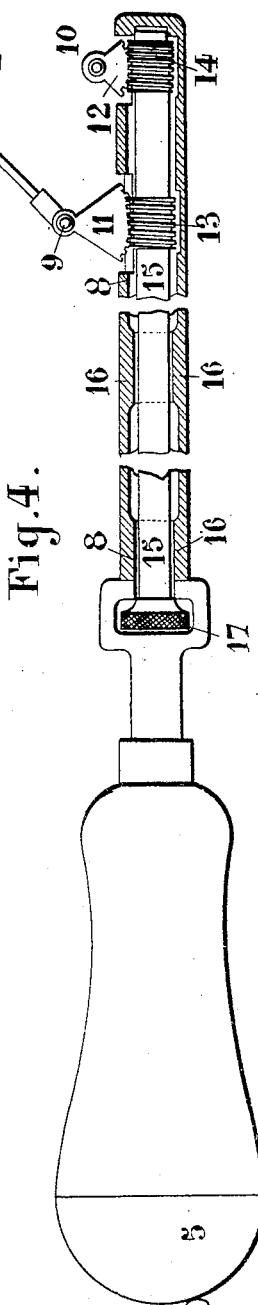
Witnesses:
E. O. Hildebrand
M. F. Anderson
Inventor
Justus Cornelis Zubli
by Georgii & Massie
Attorneys

UNITED STATES PATENT OFFICE.

JUSTUS CORNELIS ZUBLI, OF AMERSFOORT, NETHERLANDS.

SURGICAL APPARATUS FOR INTERNAL EXAMINATION.

No. 803,956.     Specification of Letters Patent.     Patented Nov. 7, 1905.

Application filed May 16, 1905. Serial No. 260,672.

*To all whom it may concern:*

Be it known that I, JUSTUS CORNELIS ZUBLI, of Amersfoort, Netherlands, have invented a new and useful Improvement in Surgical Apparatus for Internal Examination, which improvement is fully set forth in the following specification.

This invention relates to apparatus for use in all kinds of medical, surgical, dental, or other examinations or operations, permitting the operator to simultaneously illuminate the affected part, which may be difficult of access, and readily observe the illuminated part from the outside whatever be the movements given to the lighting apparatus. The apparatus may also be used for effecting certain operations from a distance while lighting and observing the effect of the different instruments employed.

According to this invention these results are obtained by means of an apparatus based on the well-known fact that if a mirror upon which a beam of light falls be turned through an angle the reflected beam is turned through twice that angle. This apparatus utilizes this fact for the simultaneous illumination and observation from a fixed point of any desired part of the organ to be treated. For this purpose the apparatus is composed of a rigid support or a support formed of rigid parts provided at its end with a small projector and a mirror whose movements of rotation round two parallel axes are interdependent, for if a projector and a mirror are turned round two parallel axes in order that the point illuminated may be reflected by the mirror in a fixed direction it is necessary that the displacement of the projector be double that of the mirror. The apparatus may be held in one hand, and the handle may contain, if desired, an electric accumulator, and by its means the operator can while looking in a fixed direction illumine and observe the part to be treated, and it may be also operated by means of suitable instruments following the movements of the projector.

The accompanying drawings show as an example one form in which the invention may be carried out in practice and also a modification.

Fig. 2 is a side elevation, and Fig. 3 a plan, of an apparatus for the lighting and operating; and Fig. 4 shows a modification.

Fig. 1 shows the principle on which the apparatus works independently of any question of the form of construction.

Figure 1:
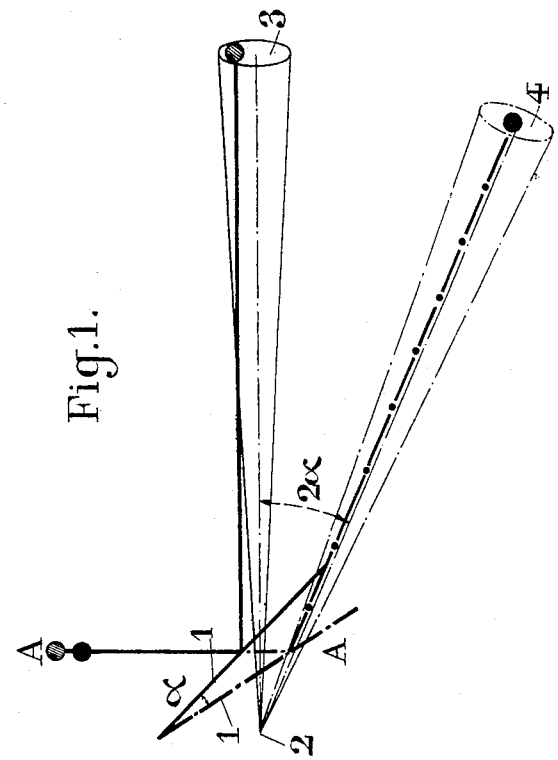
Figure 1 is a diagram illustrating the working of the apparatus.

Bearing in mind the fact above stated, it is obvious that if a mirror 1 and a projector 2 are arranged in the position shown in full lines, so that the luminous field 3 may be seen by reflection in the mirror along the line A A, it is necessary if the projector be turned through an angle 2 $\alpha$ that the mirror be turned only through an angle $\alpha$, as shown in dotted lines, in order that the new luminous field 4 may still be visible in the mirror along the line A A. If then it is desired to have only a single means of controlling the projector and the mirror, it is only necessary to so arrange this that the angular movement of the projector is twice that of the mirror.

The apparatus shown in Figs. 2 and 3 is one form in which the invention is reduced to practice. The apparatus is provided with a hollow handle 5, containing an electric accumulator 6 and provided with a contact-button 7 for completing and breaking the circuit. To the handle 5 is secured a stem 8, at the end of which are the mirror 1 and the electric projector 2. The stem 8 is hollow and contains the electric leads for the projector-lamp 2. The mirror and projector are carried on two parallel axes 9 and 10 and are fast with toothed sectors 11 and 12, whose radii are in the ratio of two to one. These sectors engage with two tangent-screws 13 and 14 of equal pitch, mounted on a spindle 15, turning in bearing 16, carried by the stem 8. The spindle 15 is moved by a milled head 17, turned by the operator's hand. The projector and mirror may occupy any convenient relative position in plan.

In Fig. 3 the projector is shown to one side of the mirror; but it may be situated beneath it and may project a beam of light through a suitable aperture in the mirror. The mirror may be viewed directly with or without an eyepiece, as shown in Fig. 2, or by means of a mirror capable of rotation in any direction and carried by the stem 8 near the handle 5.

Fig. 4 shows a modified form of control for the mirror and projector. The spindle 15, with its two screws 13 and 14, is contained in the stem 8 in order to take up less room and to screen the moving parts. In place of tangent-screws and sectors other suitable means may be employed. Instruments, such as cauteries, knives, &c., (not shown in the drawings,) may be carried by the apparatus. They may be movable and may receive the same angular movement of rotation as the projector, so that they may be operated with the latter and that their movements may be seen in the mirror.

Obviously the form and details of the apparatus may be varied in many ways without departing from the principle of the invention.

I claim—

1. In a device of the character described, the combination, with an illuminating-projector, and means for directing the rays of light from the illuminated field to the eye of the operator, of means for simultaneously aiming the projector and altering the position of the directing means to direct the light-rays to the point of observation.

2. In a device of the character described, the combination, with an illuminating-projector, and a reflector, of means for simultaneously aiming the projector and altering the inclination of the reflector to maintain the direction of the light-rays to the point of observation.

3. In a device of the character described, the combination, with an illuminating-projector, of means for simultaneously moving the projector through a given angle and the reflector through a proportionately less angle to maintain the direction of the light-rays to the point of observation.

4. In a device of the character described, the combination, with a stem, an illuminating-projector mounted thereon, and a mirror for directing the light-rays from the illuminated field to the eye of the operator, of means for simultaneously moving the projector through a desired angle and the mirror through one-half of the same angle to maintain the direction of the light-rays upon the point of observation.

5. In a device of the character described, a stem, toothed sectors carried thereby and pivotally mounted on parallel axes, an illuminating-projector fixed upon one sector, a reflecting-mirror fixed upon the other sector, a threaded spindle in engagement with the teeth of the two sectors, and means for rotating the spindle, the relation of the toothed sectors to each other and to the threaded portions of the spindle being such that the rotation of the spindle turns the projector through an arc twice as great as the mirror.

6. In a device of the character described, a stem, toothed sectors carried thereby and pivotally mounted on parallel axes, an illuminating-projector fixed upon one sector, a reflecting-mirror fixed upon the other sector, the projector-sector having a radius one-half that of the mirror-sector, a threaded spindle carried by the stem with its threads in engagement with the teeth of the sectors, and means for rotating the spindle.

7. In a device of the character described, a stem, a hollow handle containing a source of electric current, two toothed sectors carried by the stem and mounted on parallel axes, an illuminating-projector fixed upon one sector and connected by suitable wires with the electric source, a mirror fixed to the other sector, the projector-sector having a radius one-half that of the mirror-sector, a threaded spindle mounted on the stem with its threads in engagement with the teeth of the sectors, and means for rotating the spindle.

In testimony whereof I have signed this specification in the presence of two subscribing witnesses.

JUSTUS CORNELIS ZUBLI.

Witnesses:
LOUIS MARCAL,
AUGUST SIEGFRIED DOCER.